(12) United States Patent
Nagai

(10) Patent No.: US 7,265,940 B2
(45) Date of Patent: Sep. 4, 2007

(54) MAGNETIC TAPE HEAD HAVING OFFSET RECORDING/ REPRODUCING SECTIONS FOR SIMULTANEOUS RECORDING/ REPRODUCING ON ADJACENT TAPE TRACKS

(75) Inventor: Nobuyuki Nagai, Miyagi (JP)

(73) Assignee: Sony Corporation, Tokyo (JP)

(*) Notice: Subject to any disclaimer, the term of this patent is extended or adjusted under 35 U.S.C. 154(b) by 494 days.

(21) Appl. No.: 10/883,928

(22) Filed: Jul. 2, 2004

(65) Prior Publication Data

US 2005/0007700 A1 Jan. 13, 2005

(30) Foreign Application Priority Data

Jul. 10, 2003 (JP) ............................ P2003-273000

(51) Int. Cl.
*G11B 5/29* (2006.01)
*G11B 5/55* (2006.01)

(52) U.S. Cl. .................. 360/121; 360/291; 360/241.1; 360/261.1; 360/75

(58) Field of Classification Search ................ 360/121, 360/241.1, 291.6, 291.9, 261, 291, 75, 261.1
See application file for complete search history.

(56) References Cited

U.S. PATENT DOCUMENTS

| | | | | |
|---|---|---|---|---|
| 6,801,379 B2 * | 10/2004 | Ozue et al. | .................... | 360/55 |
| 6,830,183 B2 * | 12/2004 | von Mueller et al. | ........ | 235/449 |
| 6,947,256 B2 * | 9/2005 | Biskeborn et al. | .......... | 360/126 |
| 6,970,311 B2 * | 11/2005 | Jaquette | ....................... | 360/46 |
| 7,092,187 B2 * | 8/2006 | Tsuchiya et al. | ............... | 360/64 |
| 7,095,582 B2 * | 8/2006 | Kitahara | ................... | 360/77.12 |
| 2002/0034042 A1 * | 3/2002 | Hungerford et al. | ........ | 360/121 |
| 2003/0016474 A1 * | 1/2003 | Biskeborn | .................... | 360/319 |
| 2003/0123185 A1 * | 7/2003 | Denison et al. | ............. | 360/121 |
| 2004/0021982 A1 * | 2/2004 | Ozue et al. | .................. | 360/121 |
| 2005/0259358 A1 * | 11/2005 | Ozue | .......................... | 360/129 |
| 2006/0039082 A1 * | 2/2006 | Biskeborn et al. | .......... | 360/129 |

FOREIGN PATENT DOCUMENTS

| | | |
|---|---|---|
| JP | 05-046961 | 2/1993 |
| JP | 07-311901 | 11/1995 |
| JP | 10-261202 | 9/1998 |
| JP | 11-353602 | 12/1999 |

OTHER PUBLICATIONS

ECMA Standardizing Information and Communication Systems; Data Interchange on 12,7 mm 384-Track Magnetic Tape Cartridges-Ultrium-1 Format; Standard ECMA-319; Jun. 2001; pp. 1-141.

* cited by examiner

*Primary Examiner*—Jefferson Evans
(74) *Attorney, Agent, or Firm*—Robert J. Depke; Rockey, Depke & Lyons, LLC.

(57) ABSTRACT

There is provided a tape recording system and head device. A tape recording system and head device include a plurality of recording sections for recording data signals on a recording medium wherein one recording section of the plurality of recording sections and another recording section arranged so as to adjoin the one recording section are disposed such that the one recording section and the another recording section are shifted from each other in a running direction and a width direction of the recording medium, and wherein the one recording section and another recording section simultaneously record a data signal on adjacent recording tracks on the recording medium.

24 Claims, 4 Drawing Sheets

MAGNETIC TAPE HEAD HAVING OFFSET RECORDING/ REPRODUCING SECTIONS FOR SIMULTANEOUS RECORDING/ REPRODUCING ON ADJACENT TAPE TRACKS

CROSS REFERENCES TO RELATED APPLICATIONS

The present invention claims priority to its priority document No. 2003-273000 filed in the Japanese Patent Office on Jul. 10, 2003, the entire contents of which being incorporated by reference herein.

BACKGROUND OF THE INVENTION

1. Field of the Invention

The present invention relates to a tape recording system and a head device, both capable of heightening the recording density of a magnetic tape by recording a data signal on adjacent recording tracks.

2. Description of Related Art

Recently, as the amount of information to be dealt with has increased, a recording apparatus has been desired to improve its recording density and its information transfer rate. Accordingly, a magneto-resistive (MR) head having a higher detection sensitivity than that of an inductive head has been adopted, or a multitrack head having a plurality of recording heads arranged therein for recording data signals has been adopted. In particular, in a tape recording system for recording data signals in accordance with a linear recording system, the multitrack head has already been adopted in many formats. As such a tape recording system, for example, a LTO Ultrium (registered trade mark) tape drive is known. LTO Ultrium is a standard for a large capacity high speed tape, which has been drawn up on the basis of a Linear Tape-Open (LTO) technology jointly developed by Hewlett-Packard Inc., IBM Inc. and Seagate Inc. In a magnetic tape type storage system based on such a standard, a plurality of head devices provided on a magnetic head performs recording or reproducing of data simultaneously on a plurality of recording tracks for heightening the transfer rate of data.

Such a head device like a multitrack head is normally used at the time of recording various kinds of data signals on a recording medium in the shape of a tape such as a magnetic tape. As one of the linear recording systems using a multitrack head, a serpentine recording system is known. The serpentine recording system is also adopted in the above-mentioned LTO Ultrium tape drive. The serpentine recording system uses head devices the number of which is less than the number of tracks on a magnetic tape (the sequential switching of relative positions between the tracks and the head devices is required), and performs reading immediately after writing for ensuring reliability at the time of processing data signals. Moreover, the serpentine recording system is a recording system for recording data signals by driving a magnetic tape to perform back-and-forth movement to the multitrack head for achieving the shortening of processing time. The serpentine recording system is adopted by a multi track recording magnetic recording and reproducing apparatus for multitrack storing, represented by a backup storage apparatus for an information processing system and the like. Such a serpentine recording system is disclosed in, for example, Japanese Patent Application Publication H05-046961.

According to Japanese Patent Application Publication H05-046961, as shown in FIG. 6, data signal recording heads $W_1$-$W_4$ and data signal reproducing heads $R_1$-$R_4$ are coupled, respectively, to be arranged in a staggered form. Moreover, data signal recording heads $W_1$-$W_4$ are arranged with a predetermined space between each of them in magnetic gap lines $3c$ and $3d$. The data signal recording heads $W_1$-$W_4$ arranged in such a way enables servo signal recording and reproducing heads being adjacently on the same magnetic gap line to have a substantially double head pitch $2a$, and thereby enables the realization of a pattern of recording tracks and data recording heads in which a track pitch, a head pitch and a track width are substantially the same. Such an arrangement of the data recording heads is greatly advantageous for making recording track widths small. For example, when a servo track width is supposed to be 20 µm, the pitch of servo signal recording and reproducing heads being adjacently on the same magnetic gap line is 40 µm. Consequently, even if the sizes of data recording heads are limited, it is possible to provide sufficient spaces between each two of the data recording heads on the magnetic gap line, and thereby the sequential recording of data signals on recording tracks $DT_1$-$DT_{16}$ is enabled.

SUMMARY OF THE INVENTION

Of main currents of techniques for increasing a recording density and a transfer rate in a field of tape recording system for recording a data signal in accordance with the serpentine recording system, various technical developments have been performed for increasing recording density on the surface of a magnetic tape. The surface recording density, which is regarded as an index of a recording density on the surface of a magnetic tape, is generally expressed as a product of a line recording density (BPI: a bit count per inch), which is a recording density in the length direction in which the magnetic tape moves, and a recording track density (TPI: the number of tracks per inch), which is a recording density in the width direction perpendicular to the length direction.

However, in a head device of the related art like the multi head track described above, data recording heads are arranged with having spaces in-between for preventing mutual interference due to a design limitation of a data recording head device. Consequently, it is necessary to secure such spaces between the data signal recording heads. In other words, it becomes difficult to reduce such spaces, thereby preventing from increasing the recording track density.

Moreover, for narrowing recording track widths in a case where head devices such as the data signal recording heads for recording data signals are arranged in a direction of a magnetic gap, in other words the width direction of a magnetic tape, the entire portion of the multitrack head is successively shifted in the width direction of the magnetic tape while the multitrack head records a data signal on the magnetic tape. When the multitrack head is moved in accordance with the widths of recording tracks at every recording of data on the recording tracks, variations of recording track widths may be caused owing to a change of the positioning accuracy of the multitrack head and a fluctuation of the magnetic tape.

Moreover, in the serpentine recording system, owing to the design limitation of a device described above, it is regarded as a difficult task to record a data signal on adjacent recording tracks simultaneously. Moreover, when a data signal is recorded by means of such data recording heads, the multitrack head on which the data recording heads are arranged is successively moved in accordance with the widths of the recording tracks for every recording of data signal on the recording tracks. Consequently, a recording track on which the data signal has been recorded may already be overwritten owing to variations such as a displacement at the time of the multitrack head movement or variations such as a fluctuation at the time of the running of the magnetic tape. Consequently, it becomes difficult to record data signals at high accuracy while decreasing the above-mentioned displacement and fluctuation of the magnetic tape.

Moreover, in case of using such a multitrack head, it becomes necessary to form a predetermined side band between the recording tracks for absorbing variations of the magnetic tape. The side band is a region that does not contribute to the recording of data signals. It is desirable to decrease a ratio of the side band on the magnetic tape in order to heighten the recording density of the magnetic tape.

Accordingly, the present invention was made in view of the above-mentioned issues. According to an embodiment of the present invention, there is provided a tape recording system or a head device, capable of decreasing overwriting of a recording track on which a data signal has been recorded owing to, for example, displacement at the time of a head device movement, fluctuation at the time of running of a magnetic tape, or the like, whereby enabling narrowing of a pitch of recording tracks and heightening of the recording density of a magnetic tape.

A tape recording system according to an embodiment of the present invention includes a plurality of recording sections for recording a data signal on a recording medium, wherein one recording section of the plurality of recording sections and another recording section disposed adjacently to the one recording section are disposed so as to be shifted in a running direction and a width direction of the recording medium, and wherein the one recording section and the another recording section simultaneously records the data signals on recording tracks adjacent to each other on the recording medium. According to the tape recording system, the recording tracks are allowed to be densely formed in the width direction of the recording medium, almost without forming any space between adjacent recording tracks on the recording medium, in which no data signal is recorded. Moreover, substantially no space is generated between adjacent recording tracks. Furthermore, requirement for individual alignment of the recording tracks and the recording sections may be decreased. Consequently, mistracking, owing to the displacements of the recording medium and the recording sections, may be decreased, and recording tracks having almost constant widths may be formed.

According to such a tape recording system, a distance between the one recording section and the another recording section may be set to a distance such that the one recording section and another recording section do not interfere with each other. Accordingly, the interference between the recording sections at the time of data signal recording may be decreased. Consequently, the recording sections may be able to perform reliable recording of data signal while heightening the recording density. Moreover, the recording sections may be configured without being limited by a manufacturing or design limitation of the recording sections.

According to a tape recording system according to an embodiment of the present invention may be provided with reproducing sections for reproducing a recorded signal. The reproducing sections may be provided before and after each of the recording sections in the running direction of the recording medium. By means of the reproducing section arranged as above, it is possible to confirm whether the data signal has been recorded or not by the reproducing section disposed after the recording section in the running direction of the recording medium even if the recording medium is caused reciprocating (back-and-forth) movement to the recording sections. Moreover, forming the widths of the reproducing section to be narrower than the widths of the recording tracks allows to read the data signal from the regions other than the overlapping part of adjacent recording tracks.

A tape recording system according to an embodiment of the present invention is made to be a recoding system suitable for a case where the signal is recorded in accordance with the serpentine recording system. In such a tape recording system, a width of a recording track on which a data signal is recorded by at least one of the recording sections arranged on either end of the plurality of recording sections may be wider than a width of a recording track on which a data signal is recorded by the other recording section, thereby decreasing the overlapping areas in data recording regions containing the plurality of recording tracks.

In a tape recording system according to an embodiment of the present invention, the one recording section and the another recording section may be disposed such that a recording track on which the one recording section records a data signal and another recording track on which another recording section records a data signal may overlap each other in the running direction. The recording of the data signal in such a way that the adjacent recording tracks overlap each other may heighten the recording density of the recording medium.

In a tape recording system according to an embodiment of the present invention, a movement distance of the plurality of recording sections in the width direction of recording medium may be substantially the same as a sum of the recording track widths to be recorded when the recording medium is run once in the running direction of the recording medium. Accordingly, the number of movements of the recording sections allowed to be decreased in comparison with the recording method of the related art, the displacement between each of the recording sections and each of the recording tracks may be decreased.

A head device according to an embodiment of the present invention includes a plurality of recording sections for recording a data signal on a recording medium, and a head main body in which a recording section and another recording section disposed adjacently to the one recording section among the plurality of recording sections are disposed in such a way that they are staggered in a running direction and a width direction of the recording medium, wherein the one recording section and the another recording section simultaneously record the data signals on adjacent recording tracks on the recording medium. According to such a head device, the recording tracks allow to be densely formed, almost without generating any space where no data signal is recorded between the adjacent recording tracks on the recording medium. Moreover, because continuous data recording regions may be formed without generating any space between adjacent recording tracks, miss-tracks owing to displacements between the recording medium and the recording sections may be decreased, and the recording tracks having almost constant widths may be formed.

As described above, in the tape recording system and the head device according to the embodiments of the present invention, the data signal is recorded in such a way that parts of adjacent recording tracks may overlap each other by a plurality of recording sections, which are arranged as a multitrack head. Accordingly, the regions such as the side band in which no data signal is recorded may be reduced, thereby heightening the recording density of a tape-shaped recording medium.

Moreover, in the tape recording system and the head device according to the embodiments of the present invention, because the data signal may be recorded on a plurality of adjacent recording tracks when a tape-shaped recording medium is run once by employing the serpentine recording system, variations of the widths of recording tracks owing to variations of the multitrack head and/or the tape-shaped recording medium may be decreased. Further, because the variations of the track widths owing to the variations of the multitrack head and/or the tape-shaped recording medium may be generated only on a recording track in which a data signal is recorded by a recording section placed on an edge of the multitrack head, the overwriting of the data signal may be decreased by forming the region, where the data signal is recorded by the recording head positioned at the edge of the multitrack head, to be wider than the recording tracks recorded by the other recording head. Accordingly, the pitch of the recording tracks may also be narrowed, and the recording density of the tape-shaped recording medium may be improved.

BRIEF DESCRIPTION OF THE DRAWINGS

The above and other objects, features and advantages of the present invention will become more apparent from the following description of the presently preferred exemplary embodiment of the invention taken in conjunction with the accompanying drawing, in which:

FIG. 2 is a block diagram showing a multitrack head suitable for a recording apparatus of an embodiment of the present invention, in which

DESCRIPTION OF THE EMBODIMENT

Below, a tape recording system and a head device according to an embodiment of the present invention will be described in detail with reference to the drawings.

Figure 1:
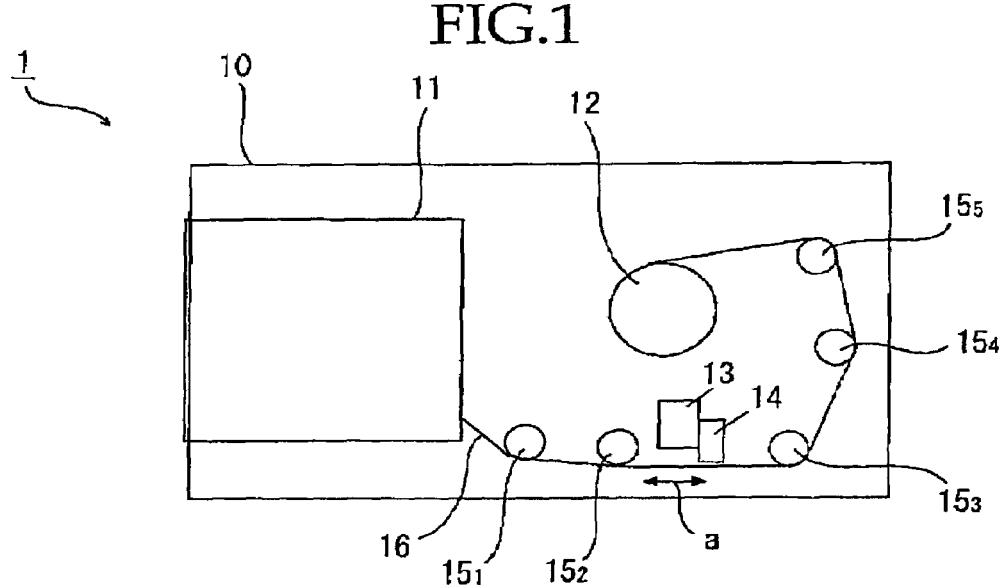
FIG. 1 is a block diagram showing a recording apparatus as an example of a tape recording system according to an embodiment of the present invention.

FIG. 1 is a view showing a configuration of a recording apparatus 1 of the present embodiment. The recording apparatus 1 includes a tape supplying section 11, guide rolls $15_1$, $15_2$, $15_3$, $15_4$ and $15_5$ for guiding a magnetic tape 16 supplied from the tape supplying section 11, a reel 12 around which the magnetic tape 16 is wound, a multitrack head 14 used as a head device for recording a data signal on the magnetic tape 16, a head drive section 13 for driving the multitrack head 14, and a housing 10 for housing those components.

The recording apparatus 1 is an example of tape recording systems for recording data signal on the magnetic tape 16 in accordance with the serpentine recording system. The recording apparatus 1 records the data signal by running the magnetic tape 16 in a reciprocating manner along an arrow A in the drawing, and by moving the multitrack head 14 in the width direction of the magnetic tape 16 by means of the head drive section 13. The head drive section 13 is driving means for moving the multitrack head 14 in the width direction of the magnetic tape 16 when the magnetic tape 16 is in a running movement in the reciprocating manner with respect to the multitrack head 14. For example, the head drive section 13 moves the multitrack head 14 so as to position the multitrack head 14 to a predetermined position by means of a known driving means such as a piezoelectric element or a magnet coil.

Figure 2A:
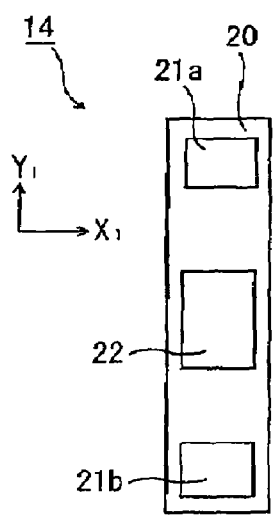
FIG. 2A is a plan view of the whole multitrack head.

FIG. 2A is an enlarged view showing the side of the multitrack head 14 facing to the magnetic tape 16. The multitrack head 14 includes a head main body 20 formed in a rectangle or rectangle-like having a long side in a $Y_1$ direction, or the width direction of the magnetic tape 16, and a recording and reproducing section 22 for recording data signal on the magnetic tape 16 and for confirming whether the data signal has been recorded or not. On both ends of the head main body 20, servo signal reproducing sections 21a and 21b are provided. Incidentally, an $X_1$ direction in the drawing indicates a running direction of the magnetic tape 16. The magnetic tape 16 is run in the $+X_1$ direction and $-X_1$ direction in a reciprocating manner. Moreover, the $Y_1$ direction in the drawing is a direction of the width of the magnetic tape 16. The multitrack head 14 is successively moved in the $+Y_1$ direction and the $-Y_1$ direction, and the data signal is recorded on the magnetic tape 16.

The servo signal reproducing sections 21a and 21b respectively include a servo head for reading servo signals recorded on the magnetic tape 16. The positioning of the multitrack head 14 is performed on the servo signals read by the servo heads. The servo signal reproducing sections 21A and 21B are allowed to control the position of the multitrack head 14 by means of, for example, an optical servo method using a laser beam or a magnetic servo method using a magnetic force. However, the servo method that may be employed in the present embodiment is not limited to those methods. Alternatively, one servo head or a plurality of servo heads may be arranged in each of the servo signal reproducing sections 21a and 21b.

The recording and reproducing section 22 is provided at the center or near the center of the multitrack head 14 in the $Y_1$ direction. The recording and reproducing section 22, as described later, includes recording sections $w_1, w_2, \ldots, w_9$ for recording data signal on the magnetic tape 16, and reproducing sections $r_{11}, r_{12}, \ldots, r_{91}$ for reading the data signal. Moreover, plural row of servo bands is formed along a data recording region on the magnetic tape 16. Moreover, the data recording region to be formed on the magnetic tape 16 may be divided into predetermined regions.

Figure 2B:
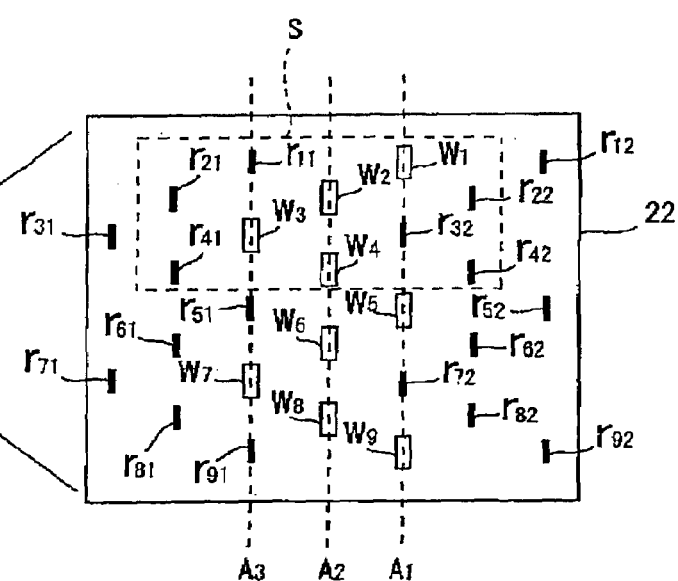
FIG. 2B is an enlarged view of recording and reproducing sections.

FIG. 2B is an enlarged view showing the recording and reproducing section 22. The recording and reproducing section 22 includes the recording sections $w_1, w_2, \ldots, w_9$ and the reproducing sections $r_{11}, r_{12}, r_{91}, r_{92}$. Those recording sections $w_1, w_2, \ldots, w_9$ and reproducing sections $r_{11}, r_{12}, \ldots, r_{91}, r_{92}$ are disposed with predetermined spaces between each of them in the recording and reproducing section 22.

Adjacent recording sections among the recording sections $w_1, w_2, \ldots, w_9$ are arranged so as to be sifted in the running direction and the width direction of the magnetic tape 16.

Such adjacent recording sections are arranged in order to simultaneously record the data signal on adjacent recording tracks on the magnetic tape 16 when the magnetic tape 16 is run once in the $+X_1$ direction or the $-X_1$ direction, which will be described later. Incidentally, the adjacent recording sections in the present embodiment is recording sections arranged to be positioned next to each other in the $Y_1$ direction in the order from the upper side of the multitrack head 14 in the drawing. For example, the recording section $w_1$ and the recording section $w_2$, the recording section $w_2$ and the recording section $w_3$ are the adjacent recording sections, respectively.

The recording sections $w_1, w_2, \ldots, w_9$ are arranged in a zigzagged manner as a whole. The recording sections $w_1, w_5$ and $w_9$ are arranged in order that their centers may be positioned on a dotted line $A_1$ in the $Y_1$ direction in the drawing. Similarly, the recording sections $w_2, w_4, w_6$ and $w_8$ are arranged in order that their centers may be positioned on a dotted line $A_2$ in the $Y_1$ direction in the drawing, and the recording sections $w_3$ and $w_7$ are arranged in order that their centers may be on the dotted line $A_3$ in the $Y_1$ direction in the drawing. These recording sections $w_1, w_2, \ldots, w_9$ are disposed so as to be shifted by a predetermined size in the longer direction of the multitrack head 14, in other words, in the $Y_1$ direction, or the width direction of the magnetic tape 16. The recording sections $w_1, w_2, \ldots, w_9$ are, for example, coils. An inductive type device for recording data signals on the magnetic tape 16 by transforming an electric signal to a variation of magnetism by means of the coil can be used as each of the recording sections $w_1, w_2, \ldots, w_9$. Also a thin film head can be used as each of the recording sections $w_1, w_2, \ldots, w_9$.

The above-mentioned adjacent recording sections are described in more detail. For example, the recording section $w_2$ adjacent to the recording section $w_1$ is disposed so as to be shifted with respect to the recording section $w_1$ in the $-X_1$ direction. The recording section $w_4$ is disposed so as to be shifted with respect to the recording section $w_3$ in the $+X_1$ direction. Moreover, the recording sections $w_1, w_2, \ldots, w_9$ are disposed so as to be shifted with respect to the recording section $w_1$ in the $-Y_1$ direction. The amount of such a shift, for example, is such that at least some parts of the adjacent recording sections adjacent in the $X_1$ direction overlap each other.

Because the adjacent recording sections are disposed so as to be shifted with respect to each other in both directions of the $X_1$ direction as the running direction of the magnetic tape 16 and the $Y_1$ direction as the width direction of the magnetic tape 16, the separated distance of adjacent recording sections are made to be a distance such that these recording sections do not interfere with each other when the data signal is recorded therein. That is, the recording section is able to record a data signal on a predetermined recording track while receiving almost no magnetic forces from adjacent recording section. Consequently, even if the data signal is simultaneously recorded on these adjacent recording tracks formed on the magnetic tape 16, erroneous data signal is not recorded on the adjacent recording tracks. In other words, a predetermined recording section is able to record an original data signal on a predetermined recording track.

Moreover, the shifting of adjacent recording sections in both of the $X_1$ direction and the $Y_1$ direction allows to secure required spaces among the recording sections $w_1, w_2, \ldots, w_9$, and also to decrease spaces among the recording tracks on which the data signal is recorded by these recording sections $w_1, w_2, \ldots, w_9$. To put it concretely, in the case where the recording sections $w_1, w_2, \ldots, w_9$, are inductive type devices, these recording sections are disposed by keeping a distance in such a way that the magnetic force of a recording section does not affect the other recording sections. Moreover, even if the required spaces are provided among the recording sections owing to a size limitation of the head devices, i.e., the recording sections $w_1, w_2, \ldots, w_9$, the spaces among the recording tracks on which the data signal is recorded by those recording sections $w_1, w_2, \ldots, w_9$ are reduced while the head devices are separated with sufficient distances from one another. Consequently, the data signal can be recorded on adjacent recording tracks without any limitations owing to sizes of the head devices as the recording sections.

The reproducing sections $r_{11}, r_{12}, \ldots, r_{92}$ are arranged at positions before and after those of the recording sections $w_1, w_2, \ldots, w_9$ in the running direction of the magnetic tape 16. When the data signal is recorded on the magnetic tape 16 in accordance with the serpentine recording system, the magnetic tape 16 is run in the reciprocating manner with respect to the multitrack head 14. The reproducing sections $r_{11}, r_{12}, \ldots, r_{92}$, which are arranged before and after those of the recording sections $w_1, w_2, \ldots, w_9$, reproduce the data signals recorded on the magnetic tape 16 by the recording sections $w_1, w_2, \ldots, w_9$, and confirm whether the recording has been performed or not. To explain the recording sections $w_1$ and the reproducing sections $r_1$ and $r_{12}$ as an example, the reproducing section repositioned behind the recording section $w_1$ in the running direction of the magnetic tape 16 reads a recorded data signal when the magnetic tape 16 runs in the $+X_1$ direction. When the magnetic tape 16 runs in the $-X_1$ direction, the reproducing section $r_{12}$ positioned behind the recording section $w_1$ in the running direction of the magnetic tape 16 reads a recorded data signal.

Moreover, the reproducing sections $r_{11}, r_{12}, \ldots, r_{92}$ disposed before and after those of the recording sections $w_1, w_2, \ldots, w_9$ may be arranged while keeping a distance such that each of the reproducing sections does not interfere with the other. The reproducing sections $r_{11}, r_{12}, \ldots, r_{92}$ may be also disposed to have almost the same space to each of the recording sections $w_1, w_2, \ldots, w_9$. Moreover, the reproducing sections $r_{11}, r_{12}, \ldots, r_{92}$ to be disposed before and after those of the recording sections $w_1, w_2, \ldots, w_9$ may be disposed to have different spaces to each of the recording sections $w_1, w_2, \ldots, w_9$. As each of the reproducing sections $r_{11}, r_{12}, \ldots, r_{91}, r_{92}$, the above-mentioned inductive type device or a magneto-resistance effect type device having a reproduction sensitivity of a data signal higher than that of the inductive type device may be used. As the magneto-resistance type device, for example, a magneto-resistive head (MR head) may be used. Incidentally, the position of the recording sections and the reproducing sections is not limited to the above-mentioned position of the recording sections $w_1, w_2, \ldots, w_9$ and the reproducing sections $r_{11}, r_{12}, \ldots, r_{92}$, but it is needless to say that the position may be suitably changed without departing from the scope of the present invention. Moreover, the number of the recording sections disposed on the multitrack head is not also limited to the above-mentioned number.

Figure 3:
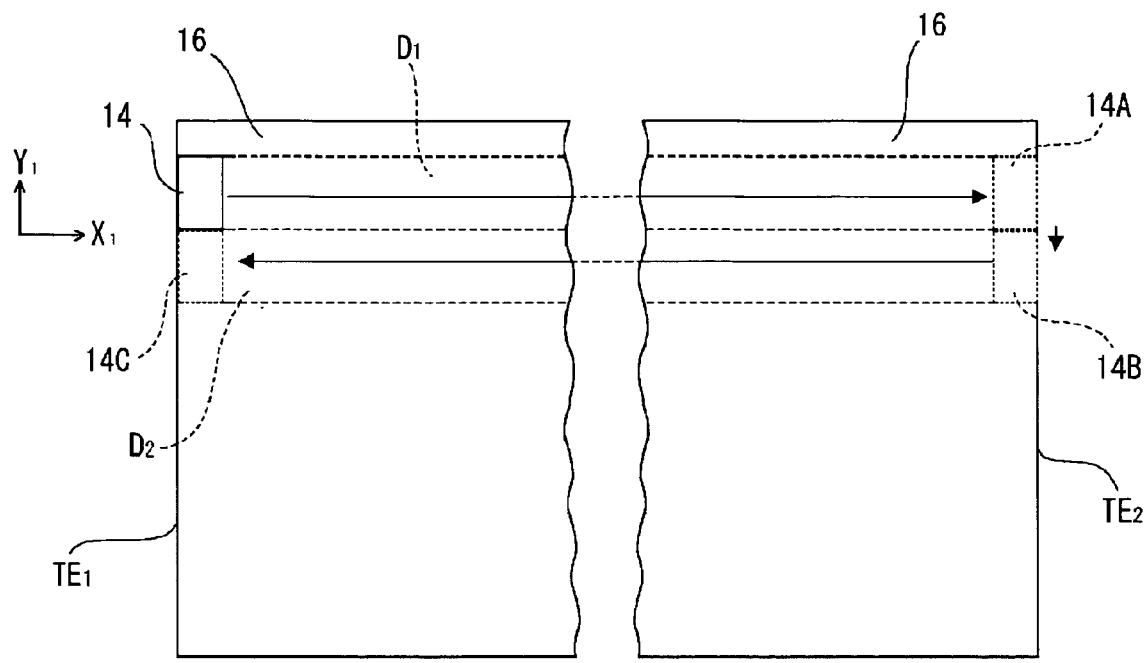
FIG. 3 is a view illustrating a movement of a multitrack head in a recording apparatus according to an embodiment of the present invention.

Movements of the multitrack head 14 when the data signal is recorded on the magnetic tape 16 are described with FIG. 3. The recording tracks, on which the data signal is recorded by the respective recording sections, are described with FIG. 4.

FIG. 3 is a view illustrating the movements of the multitrack head 14. The multitrack head 14 reciprocates between tape ends $TE_1$ and $TE_2$ as both ends of the magnetic tape 16 to record data signals on the magnetic tape 16. The multitrack head 14 relatively moves in the $+X_1$ direction against the magnetic tape 16 by a run of the magnetic tape 16 in the $-X_1$ direction. The multitrack head 14 reaches the position indicated by a multitrack head 14A in the vicinity of the tape end $TE_2$, and then the multitrack head 14 records data signals in a data recording region D1 ranging from the tape end $TE_1$ to the tape end $TE_2$. Successively, the multitrack head 14 is moved by the head drive section 13 in the $-Y_1$ direction by the width of the data recording region D1 to reach a position indicated by a multitrack head 14B. Successively, the magnetic tape 16 is run in the $+X_1$ direction, and thereby the multitrack head 14 moves from the tape end $TE_2$ to the tape end $TE_1$ to reach a position indicated by multitrack head 14C. The multitrack head 14 records data signals into a data recording region $D_2$ ranging from the multitrack head 14B to the multitrack head 14C. The data recording region $D_2$ is formed to adjoin to a recording track positioned on the lower most side of the recording tracks constituting the data recording region $D_1$.

Moreover, when the multitrack head 14 reaches the tape end $TE_1$, the head drive section 13 again moves the multitrack head 14 in the $-Y_1$ direction by the width of the data recording region $D_2$. Then, the head drive section 13 runs the magnetic tape 16 in the $+X_1$ direction while performing the record of data signals. The multitrack head 14 performs such a recording operation of the data signals across the full width of the magnetic tape 16 to record the data signals on the magnetic tape 16. In such a way, the recording apparatus 1 moves the multitrack head 14 from the tape end $TE_1$ to the tape end $TE_2$ of the magnetic tape 16, and shifts the multitrack head 14 in the width direction of the magnetic tape 16 to record the data signals on the magnetic tape 16. When the recording apparatus 1 moves the multitrack head 14, the servo signal reproducing sections 21a and 21b read servo signals on servo tracks formed on the magnetic tape 16 while the recording apparatus 1 moves the multitrack head 14.

In the data recording region $D_1$, the recording tracks on which the data signals recorded by the recording sections $w_1, w_2, \ldots, w_9$ are formed into a state that almost no gaps exists in the width direction of the magnetic tape 16, in other words, the $Y_1$ direction. The recording tracks formed by the recording sections $w_1, w_2, \ldots, w_9$ can be formed with almost no gaps in comparison with those by the normal serpentine recording system, and the spaces among the recording tracks can be reduced.

When the multitrack head 14 is shifted in the $-Y_1$ direction, the multitrack head 14 is shifted in the $-Y_1$ direction by the width size of the data recording region in which the data signal is recorded by the multitrack head 14, and data recording regions are sequentially formed. The width size of the data recording region $D_1$ formed at the time of the movement of the multitrack head 14 from the tape end $TE_1$ to the tape end $TE_2$, or the width size of the data recording region $D_2$ at the time of the movement of the multitrack head 14 from the tape end $TE_2$ to the tape end $TE_1$ is almost the same as the sum of the width sizes of the recording tracks on which the data signal is recorded by the recording sections $w_1, w_2, \ldots, w_9$ provided in the multitrack head 14. That is, the width size of the data recording region formed by a run of the multitrack head 14 in the $+X_1$ direction or the $-X_1$ direction and the movement distance by which the multitrack head 14 is moved in the $-Y_1$ direction are substantially the same.

As described above, when the magnetic tape 16 is once run in the $X_1$ direction, the recording sections $w_1, w_2, \ldots, w_9$ provided in the multitrack head 14 allows simultaneously to record data signals on adjacent recording tracks on the magnetic tape 16 by adjacent recording sections. Accordingly, data signals is able to be recorded on all of the recording tracks in a data recording region by running the magnetic tape 16 in the $X_1$ direction. Consequently, in comparison with the case, for example, with the use of the conventional serpentine recording system, where recording sections and recording tracks are positioned by the successive movement of the multitrack head 14 according to the widths of the recording tracks, the data signals can be recorded without positioning the recording sections $w_1, w_2, \ldots, w_9$ accurately to the recording tracks at every back-and-forth movement of the magnetic tape 16. Moreover, because a variation of the position of the multitrack head 14 and a variation of the position of the magnetic tape 16 may produce a defect such as a variation of the recording track widths only to the recording tracks positioned on the outermost edges among the recording tracks to be recorded when the magnetic tape 16 is once run in the $+X_1$ direction or the $-X_1$ direction, it becomes unnecessary to provide a space for absorbing the above-mentioned variations to every recording track by forming the width of the recording track, which is positioned at the edge at least on one side among the recording tracks on which the data signal is recorded by a run of the magnetic tape 16, to be wider than the width of the other recording tracks, and the recording density of the whole magnetic tape 16 is allowed to be heightened.

For example, when a space of 1 μm is formed between recording tracks each having a recording track width of 10 μm, the ratio of the space to the recording track width is 10%. When a space of 1 μm is formed between recording tracks each having a recording track width of 5 μm, the ratio of the space to the recording track width is 20%. That is, when recording track widths are narrowed with an object of heightening the recording density of the magnetic tape 16, regions in which the data signal is recorded are decreased in the whole of the magnetic tape 16. However, by narrowing the pitches of the recording tracks, the effects of the narrowing of the recording track widths is able to be reflected for improving the recording density as they are.

Moreover, the width of a recording track on which data signal is recorded by at least one recording section in the recording sections $w_1$ and $w_9$ arranged on both edges of the multitrack head 14 is set to be larger than the widths of the recording tracks on which data signal is record by another recording sections. Consequently, when the whole multitrack head 14 is shifted while a data signal is recorded in a new data recording region $D_2$ adjacent to the data recording region $D_1$ by reciprocating the multitrack head 14 between a couple of servo bands by a plurality of times, the adjacent data recording regions $D_1$ and $D_2$ form almost no overlapping regions, and almost no overwriting is produced.

Figure 4:
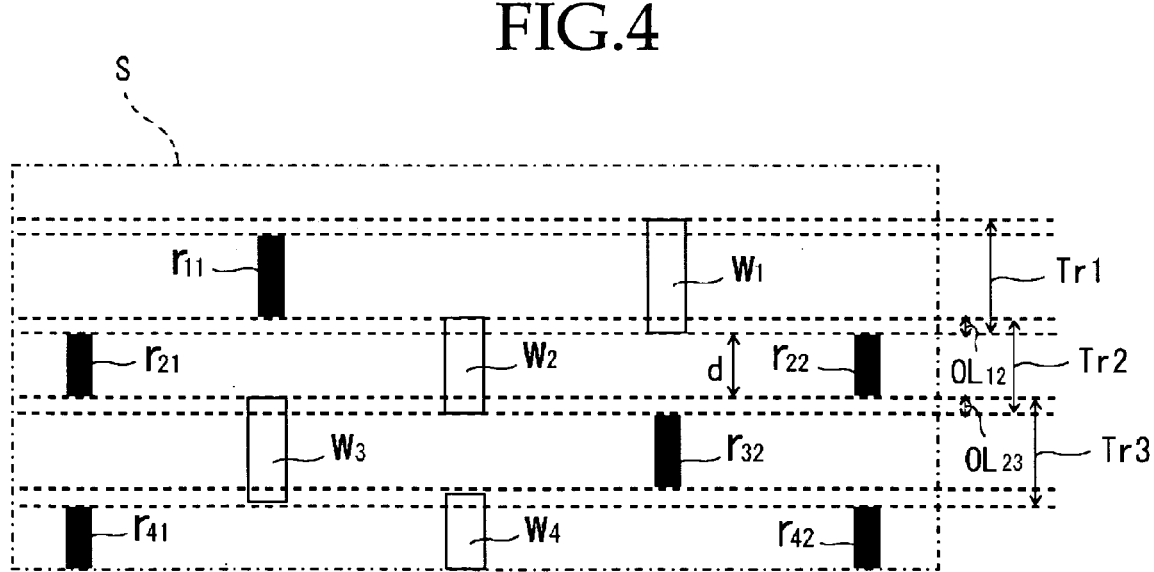
FIG. 4 is an enlarged view showing a recording and reproducing sections in the recording apparatus according to an embodiment of the present invention.

Successively, FIG. 4 is referred to while detailed descriptions are given to the arrangements of the recording sections $w_1, w_2, \ldots, w_9$, and the reproducing sections $r_{11}, r_{12}, \ldots, r_{91}, r_{92}$, and the recording tracks formed by the recording sections $w_1, w_2, \ldots, w_9$. FIG. 4 is an enlarged view showing a region S as a part of a recording and reproducing section 22.

As shown in FIG. 4, the recording section $w_1$ and the recording section $w_2$ are able to be disposed in order that a recording track $Tr_2$ on which a data signal is recorded by the recording section $w_2$ and a recording track $Tr_1$ formed by the recording section $w_1$ may overlap each other. For example, the recording track $Tr_1$ and the recording track $Tr_2$ overlap each other at an overlapping part $OL_{12}$. Consequently, recording tracks can be densely formed without forming any spaces such as a side band on which no data signal is recorded between the recording track $Tr_1$ and the recording track $Tr_2$. Similarly, the recording track $Tr_2$ on which the data signal is recorded by the recording section $w_2$ and a recording track $Tr_3$ on which a data signal is recorded by the recording section $w_3$ overlap each other at an overlapping part $OL_{23}$. In such a manner, data recording regions in which data signal is recorded by the multitrack head 14 in a run of the magnetic tape 16 is able to constitute continuous data recording regions in the width direction of the magnetic tape 16 through the overlapping parts of each recording track. Consequently, the recording density of the magnetic tape 16 may be heightened.

The recording sections $w_1, w_2, \ldots, w_9$ are able to be disposed in order that overlapping parts such as the above-mentioned overlapping parts $OL_{12}$ and $OL_{23}$ are formed between adjacent recording tracks. Consequently, data recording regions having uniform widths can be formed, being scarcely affected by displacement of the multitrack head 14 or by tape misalignment at the time of the back-and-forth movement of the magnetic tape 16. Moreover, when the present embodiment is compared with the conventional serpentine recording system, the present embodiment makes it possible to record data signals on recording tracks in uniform widths in comparison with the case where the recording sections and the recording tracks are positioned by moving the multitrack head at every record of data signals on the recording tracks.

Moreover, the reproducing sections $r_{11}, r_{12}, \ldots, r_{92}$ are severally formed in a size smaller than the width size of each of the recording tracks on which data signal is recorded by the recording sections $w_1, w_2, \ldots, w_9$. The centers of the recording sections $w_1, w_2, \ldots, w_9$ and the centers of the reproducing sections $r_{11}, r_{12}, \ldots, r_{92}$ almost coincide with each other. Accordingly, the reproducing sections $r_{11}, r_{12}, \ldots, r_{92}$ are disposed before and after the recording sections $w_1, w_2, \ldots, w_9$ in order to avoid the overlapping parts of the recording tracks, and the reproducing sections $r_{11}, r_{12}, \ldots, r_{92}$ is able to read the data signals recorded in the regions avoiding the overlapping parts between the recording tracks. For example, when the reproducing sections $r_{21}$ and $r_{22}$ are disposed behind the recording section $w_2$ in the running direction of the magnetic tape 16, the reproducing sections $r_{21}$ and $r_{22}$ read the data signal recorded in the region of the recording track $Tr_2$. That is, the reproducing sections $r_{11}, r_{12}, \ldots, r_{92}$ are capable of confirming recorded data signals without being affected by the overlapping parts of adjacent recording tracks.

In such a way, the plurality of recording sections $w_1, w_2, \ldots, w_9$ disposed in the multitrack head 14 are disposed so as to be shifted in the running direction and the width direction of the magnetic tape 16, and these recording sections $w_1, w_2, \ldots, w_9$ are disposed in order that adjacent recording tracks may overlap each other. Consequently, the recording tracks can be densely formed, without generating a space between recording tracks. Recording track widths are narrowed to form recording tracks densely on a magnetic tape. Accordingly, the recording density of the whole magnetic tape 16 can be heightened. Moreover, it also becomes possible to form the recording tracks with almost constant widths uniformly, almost without generating displacement between the multitrack head 14 and the magnetic tape 16 at the time of the movement of the multitrack head 14 or the back-and-forth movement of the magnetic tape 16.

Figure 5:
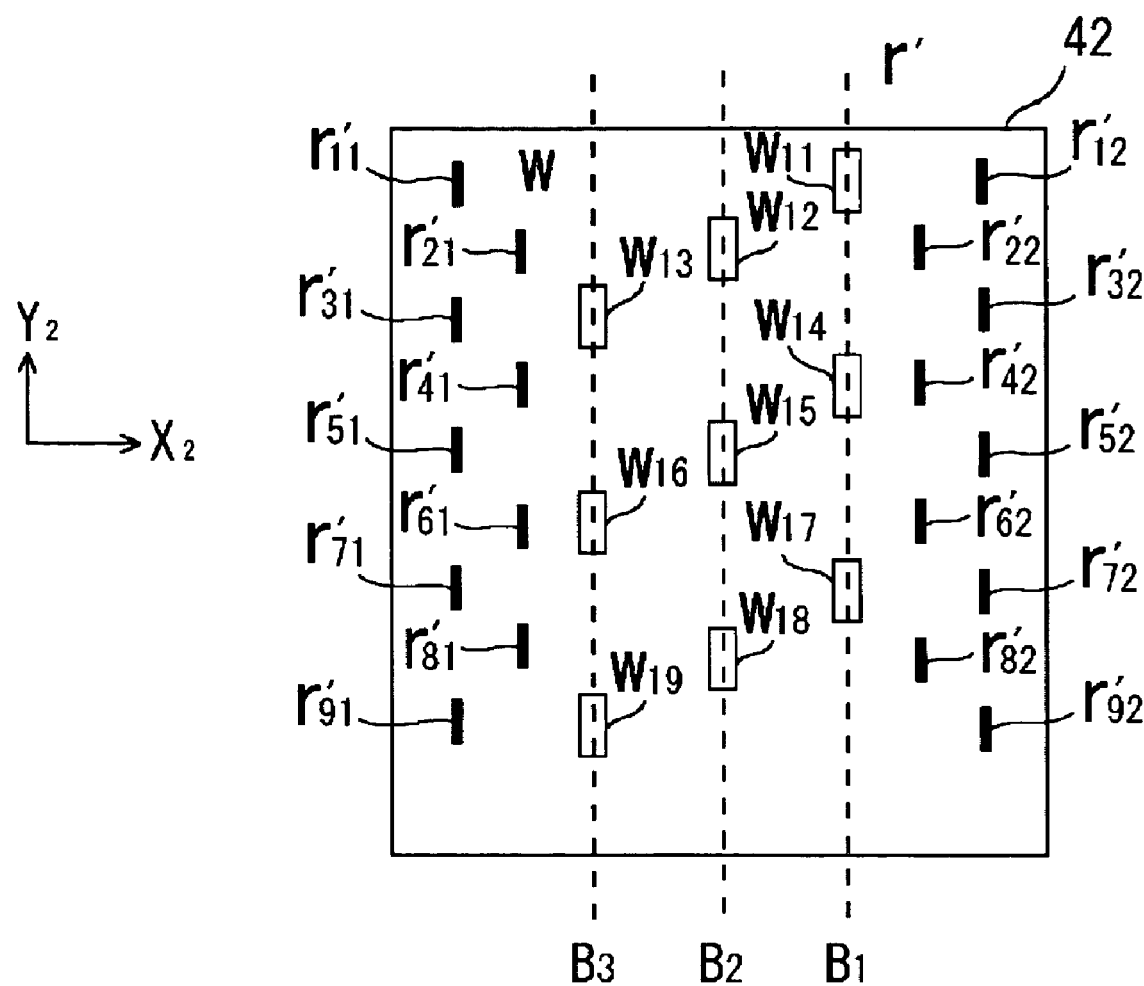
FIG. 5 is a block diagram showing another example of a multitrack head suitable for a recording apparatus according to an embodiment of the present invention.
Figure 6:
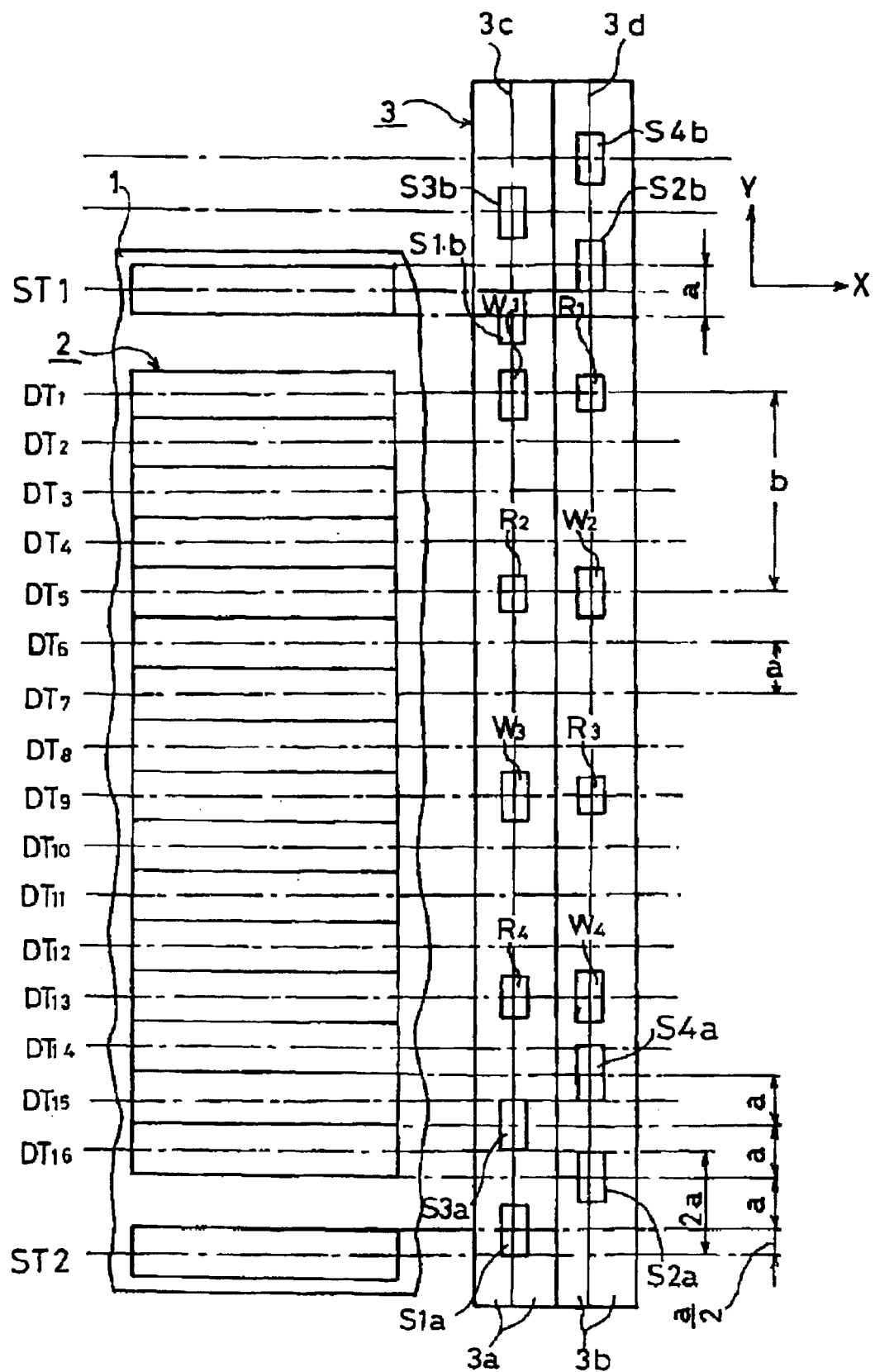
FIG. 6 is a view illustrating a serpentine recording method using a multitrack head of the related art.

Next, FIG. 5 is referred to while another example of the multitrack head in which recording sections and reproducing sections are arranged is described. FIG. 5 is an enlarging view showing a recording and reproducing section 42 of a multitrack head having a configuration similar to that of the multitrack head 14. Incidentally, an $X_2$ direction in the drawing is a direction that a magnetic tape as a tape-shaped recording medium is run in a reciprocating manner. A $Y_2$ direction perpendicular to the $X_2$ direction is the width direction of the magnetic tape. The multitrack head records data signals on the whole magnetic tape by being sequentially moved in the $Y_2$ direction at the time of the switching of the running direction of the magnetic tape.

The multitrack head includes nine recording sections $w_{11}, w_{12}, \ldots, w_{19}$ and nine reproducing sections $r'_{11}, r'_{12}, \ldots, r'_{92}$. The recording sections $w_{11}, w_{12}, \ldots, w_{19}$ are severally disposed so as to be shifted to adjacent recording sections in the $X_2$ direction, which is the running direction of the magnetic tape, and the $Y_2$ direction, which is the width direction of the magnetic tape. Incidentally, an adjacent recording section of the multitrack head of the present example means a recording section disposed in the $Y_2$ direction from the upper end thereof in order. For example, the recording section $w_{11}$ and the recording section $w_{12}$, and the recording section $w_{12}$ and the recording section $w_{13}$ are severally adjacent recording sections.

The recording sections $w_{11}, w_{14}, \ldots, w_{17}$ are disposed in the $Y_2$ direction in order that the centers of these recording sections may be positioned on a dotted line $B_1$ in the drawing. Similarly, the recording sections $w_{12}, w_{15}$ and $w_{18}$ are disposed in the $Y_2$ direction in order that the centers of these recording sections may be positioned on a dotted line $B_2$ in the drawing. The recording sections $w_{13}, w_{16}, \ldots, w_{19}$ are disposed in the $Y_2$ direction in order that the centers of these recording sections may be positioned on a dotted line $B_3$ in the drawing. These recording sections $w_{11}, w_{12}, \ldots, w_{19}$ are disposed so as to be shifted by a predetermined size in the $Y_2$ direction, which is the width direction of the magnetic tape 16. The recording sections $w_{11}, w_{12}, \ldots, w_{19}$ are able to use inductive type devices for converting electric signals to variations of magnetism to record data signals on a magnetic tape. For example, the recording sections $w_{11}, w_{12}, \ldots, w_{19}$ are able to use coils. Moreover, as the recording sections $w_{11}, w_{12}, \ldots, w_{19}$ thin film heads are also allowed to be used.

The above-mentioned adjacent recording sections are described further in detail. For example, the recording section $w_{12}$ adjacent the recording section $w_{11}$ is disposed so as to be shifted by a predetermined distance with respect to the recording section $w_1$ in the $-X_2$ direction. The recording section $w_{14}$ is disposed so as to be shifted with respect to the recording section $w_{12}$ in the $+X_2$ direction. Moreover, the recording sections $w_{11}, w_{12}, \ldots, w_{19}$ are disposed, from the recording section $w_{11}$ in order, so as to be shifted in the $-Y$ direction, and the amount of shift is set such that at least some parts of the recording tracks on which data signal is record by adjacent recording sections overlap each other.

Such a position of adjacent recording sections to be shifted in order that adjacent recording tracks may partially overlap is allowed to dispose the recording sections $w_{11}, w_{12}, \ldots, w_{19}$ by taking a distance that each of them does not interfere with the other. Moreover, the arrangement enables the spaces between recording tracks on which data signal is recorded by the recording sections $w_{11}, w_{12}, \ldots, w_{19}$ to be reduced. Moreover, when needed spaces are provided between recording sections owing to a size limitation of the devices as the recording sections $w_{11}, w_{12}, \ldots, w_{19}$ the spaces are able to be secured by disposing adjacently to recording sections to be shifted with respect to each other by needed distances in the $X_2$ direction. Moreover, owing to the provision of the above-mentioned spaces according to device sizes between adjacent recording sections, and the capability of the reduction of spaces between recording tracks on which data signal is recorded by these recording sections $w_{11}, w_{12}, \ldots, w_{19}$, the recording density of a magnetic tape is allowed to be heightened.

The reproducing section $r'_{11}, r'_{12}, \ldots, r'_{92}$ are disposed before and after those of the recording sections $w_{11}, w_{12}, \ldots, w_{19}$ in the $X_2$ direction as the running direction of the magnetic tape. In the case where data signal is recorded on the magnetic tape in accordance with the serpentine recording system, the magnetic tape is run in a reciprocating manner to the multitrack head, and the reproducing sections $r'_{11}, r'_{12}, \ldots, r'_{92}$ disposed before and after those of the recording sections $w_{11}, w_{12}, \ldots, w_{19}$, reproduces the data signals, recorded on the magnetic tape by the recording sections $w_{11}, w_{12}, \ldots, w_{19}$ to confirm whether recording has been performed surely or not. To explain the recording section $w_{11}$, the reproducing sections $r'_{11}$ and $r'_{12}$ as an example, when the magnetic tape is run in the $+X_2$ direction, the reproducing section $r'_{11}$, behind the recording section $w_{11}$ in the running direction of the magnetic tape, reads a data signal. When the magnetic tape is run in the $-X$ direction, the reproducing section $r'_{12}$ positioned behind the recording section $w_{11}$ in the running direction of the magnetic tape reads a data signal.

Moreover, the reproducing sections $r'_{11}, r'_{12}, \ldots, r'_{92}$ may be disposed by taking a distance that each of them does not interfere with the other ones. The reproducing sections $r'_{11}, r'_{12}, \ldots, r'_{92}$ may be disposed by taking substantially equal spaces severally to the recording sections $w_{11}, w_{12}, \ldots, w_{19}$. Moreover, the reproducing sections $r_{11}, r_{12}, \ldots, r_{92}$ may be disposed before and after those of the recording sections $w_{11}, w_{12}, \ldots, w_{19}$ with different spaces. As the reproducing sections $r_{11}, r_{12}, \ldots, r_{91}, r_{92}$, an inductive type device or a magneto-resistance effect type device having a reproduction sensitivity of a data signal higher than that of the inductive type device may be used. Incidentally, the recording sections and the reproducing sections are not limited to the above-mentioned recording sections $w_{11}, w_{12}, \ldots, w_{19}$ and the reproducing sections $r'_{11}, r'_{12}, \ldots, r'_{92}$, it is needless to say that the recording sections and the reproducing sections can be suitably changed without departing from the scope of the present invention. Moreover, the number of the recording sections is not limited to the above-mentioned number.

As described above, a plurality of recording sections $w_{11}, w_{12}, \ldots, w_{19}$ disposed in a multitrack head are disposed so as to be shifted in the running direction of a magnetic tape, and further those recording sections $w_{11}, w_{12}, \ldots, w_{19}$ are disposed in order that parts of adjacent recording tracks may overlap each other. Accordingly, no spaces are produced between recording tracks. Accordingly, by narrowing recording track widths to form recording tracks densely, the recording density of the whole magnetic tape is allowed to be heightened. Moreover, when the multitrack head is moved, or when the magnetic tape is run in a reciprocating manner, displacement between the multitrack head and the magnetic tape is hardly produced, and it becomes also possible to form the recording tracks with a substantially uniform width.

What is claimed is:

1. A linear tape recording and reproducing system comprising:
    a plurality of recording sections for recording data signals linearly on a recording medium, and
    a plurality of reproducing sections for reproducing data signals linearly recording on a recording medium;
    wherein one recording section of the plurality of recording sections and another recording section adjacent the one recording section are arranged such that the one recording section and the another recording section are shifted from each other in a running direction and a width direction of the recording medium;
    wherein, in a first mode, the one recording section and the another recording section simultaneously record a data signal on adjacent recording tracks on the recording medium;
    wherein one reproducing section of the plurality of reproducing sections and another reproduction section adjacent the one reproducing section are arranged such that the one reproducing section and the another reproducing section are shifted from each other in a running direction and a width direction of the recording medium; and
    wherein, in a second mode, the one reproducing section and the another reproducing section simultaneously reproduce data signals from adjacent recording tracks on the recording medium.

2. The linear tape recording and reproducing system according to claim 1, wherein:
    a distance between the one recording section and another recording section is a distance such that the one recording section and the other recording section do not interfere with each other.

3. The linear tape recording and reproducing system according to claim 1, further comprising:
    a plurality of reproducing sections that reproduce a data signal; and
    wherein the reproducing sections are provided before and after each of the recording sections in the running direction of the recording medium.

4. The linear tape recording and reproducing system according to claim 3, wherein:
    a width of the reproducing section is narrower than a width of the recording track on which the data signal is recorded.

5. The linear tape recording and reproducing system according to claim 1, wherein:
    the data signal is recorded with a serpentine recording system.

6. The linear tape recording and reproducing system according to claim 1, wherein:
    the one recording section and the another recording section are disposed such that a recording track on which the one recording section records a data signal and another recording track on which the another recording section records a data signal overlap each other in the running direction.

7. The linear tape recording and reproducing system according to claim 1, further wherein at least one reproducing section is provided in a tape running direction from each one of said recording sections, and at least one reproducing section is also provided a reverse tape running direction from each one of said recording sections.

8. The linear tape recording and reproducing system according to claim 1, further wherein the width of each recording section is greater than the width of each reproducing section, and wherein there is at least one reproducing section substantially centered with each recording section in the tape running direction.

9. The linear tape recording and reproducing system according to claim 1, wherein there are at least three recording sections, each shifted in both the running direction and width direction of the recording medium from each other.

10. The linear tape recording and reproducing system according to claim 9, further wherein there are at least three reproducing sections, each shifted in both the running direction and width direction of the recording medium from each other.

11. The linear tape recording and reproducing system according to claim 1, further wherein there are at least four columns of read sections extending in the width direction of the recording medium, at least one of said columns comprises read sections shifted in both the width and running-direction of the recording medium relative to the read sections of another of said columns.

12. The linear tape recording and reproducing system according to claim 1, wherein a width of a recording track on which a data signal is recorded by one of the recording sections disposed on either end of the plurality of recording sections is wider than a width of a recording track on which a data signal is recorded by a recording section other than one of the other recording sections disposed on either end.

13. The linear tape recording and reproducing system according to claim 1, wherein the one recording section and the adjacent another recording section are formed such that the corresponding recording tracks recorded on the recording medium overlap one another.

14. A tape recording system comprising:
a plurality of recording sections for recording data signals linearly on a recording medium;
wherein one recording section of the plurality of recording sections and another recording section adjacent the one recording section are arranged such that the one recording section and the another recording section are shifted from each other in a running direction and a width direction of the recording medium; and
wherein the one recording section and the another recording section simultaneously record a data signal on adjacent recording tracks on the recording medium, and
a width of a recording track on which a data signal is recorded by one of the recording sections disposed on either end of the plurality of recording sections is wider than a width of a recording track on which a data signal is recorded by a recording section other than one of the other recording sections disposed on either end of the plurality of recording sections.

15. A tape recording system comprising:
a plurality of recording sections for recording data signals linearly on a recording medium;
wherein one recording section of the plurality of recording sections and another recording section adjacent the one recording section are arranged such that the one recording section and the another recording section are shifted from each other in a running direction and a width direction of the recording medium; and
wherein the one recording section and the another recording section simultaneously record a data signal on adjacent recording tracks on the recording medium, and
a movement distance of the plurality of recording sections in the width direction of the recording medium is substantially the same as a sum of the recording track widths to be recorded if the recording medium is run once in the running direction of the recording medium.

16. A tape recording system comprising:
a plurality of recording sections for recording data signals linearly on a recording medium;
wherein one recording section of the plurality of recording sections and another recording section adjacent the one recording section are arranged such that the one recording section and the another recording section are shifted from each other in a running direction and a width direction of the recording medium; and
wherein the one recording section and the another recording section simultaneously record a data signal on adjacent recording tracks on the recording medium, and
means for moving the plurality of recording sections in the width direction, and wherein
the means for moving contains at least a piezoelectric element or magnet coil.

17. A head apparatus comprising:
a plurality of recording sections for recording a data signal linearly on a recording medium;
a plurality of reproducing sections for reproducing a data signal recorded linearly on a recording medium; and
a head main body in which a first recording section and an adjacent second recording section of the plurality of recording sections are disposed such that the first recording section and the second recording section are staggered in a running direction and a width direction of the recording medium, and a first reproducing section and an adjacent second reproducing section of the plurality of reproducing sections are disposed such that the first reproducing section and the second reproducing section are staggered in a running direction and a width direction of the recording medium;
wherein, in a first mode, the first recording section and the second recording section simultaneously record a data signal on adjacent recording tracks on the recording medium; and
wherein, in a second mode, the first reproducing section and the second reproducing section simultaneously reproduce a data signal on adjacent recording tracks from the recording medium.

18. The head apparatus according to claim 17, further wherein at least one reproducing section is provided in a tape running direction from each one of said recording sections, and at least one reproducing section is also provided a reverse tape running direction from each one of said recording sections.

19. The head apparatus according to claim 17, further wherein the width of each recording section is greater than the width of each reproducing section, and wherein there is at least one reproducing section substantially centered with each recording section in the tape running direction.

20. The head apparatus according to claim 17, wherein there are at least three recording sections, each shifted in both the running direction and width direction of the recording medium from each other.

21. The head apparatus according to claim 20, further wherein there are at least three reproducing sections, each shifted in both the running direction and width direction of the recording medium from each other.

22. The head apparatus according to claim 17, further wherein there are at least four columns of read sections extending in the width direction of the recording medium, at least one of said columns comprises read sections shifted in both the width and running-direction of the recording medium relative to the read sections of another of said columns.

23. The head apparatus according to claim 17, wherein a width of a recording section disposed on either end of the plurality of recording sections is wider than a width of a recording section other than one of the other recording sections disposed on either end of the plurality of recording sections.

24. The head apparatus according to claim 17, wherein the adjacent first and second recording sections are formed such that the ends of the sections overlap in the width direction of the recording medium.

* * * * *